United States Patent [19]

Yoshikawa

[11] Patent Number: 5,164,788

[45] Date of Patent: Nov. 17, 1992

[54] METHOD AND APPARATUS FOR CONTROLLING RECIPROCATION OF MOVABLE MIRROR FOR PHOTOACOUSTIC FOURIER TRANSFORM SPECTROSCOPY

[75] Inventor: Osamu Yoshikawa, Kyoto, Japan

[73] Assignee: Shimadzu Corporation, Kyoto, Japan

[21] Appl. No.: 635,069

[22] Filed: Dec. 28, 1990

[30] Foreign Application Priority Data

Dec. 29, 1989 [JP] Japan .................................. 1-342372

[51] Int. Cl.$^5$ ............................................... G01B 9/02
[52] U.S. Cl. .................................................. 356/346
[58] Field of Search ......................................... 356/346

[56] References Cited

U.S. PATENT DOCUMENTS 4,413,908 11/1983 Abrams ............................. 356/346
4,847,878 7/1989 Badeau .............................. 356/346

Primary Examiner—Samuel A. Turner
Attorney, Agent, or Firm—Nikaido, Marmelstein, Murray & Oram

[57] ABSTRACT

A method and apparatus for controlling the reciprocation of a movable mirror of an interferometer used in an interferometric spectrophotometer are disclosed, wherein a frequency dividing ratio corresponding to a desired reciprocating speed of the movable mirror is set and then a pulse signal from an oscillator is divided at a the frequency dividing ratio for producing a frequency-divided signal which in turn is compared with an interference signal from a control interferometer to produce an error signal for controlling the reciprocating speed of the movable mirror based on this error signal until the desired reciprocating speed is reached. Preferably, the frequency dividing ratio can be varied by a central processing unit, for example, so that the user is able to freely change the reciprocating speed of the movable mirror to conform to the type of a detector used, thereby enabling a measurement under optimum conditions.

5 Claims, 5 Drawing Sheets

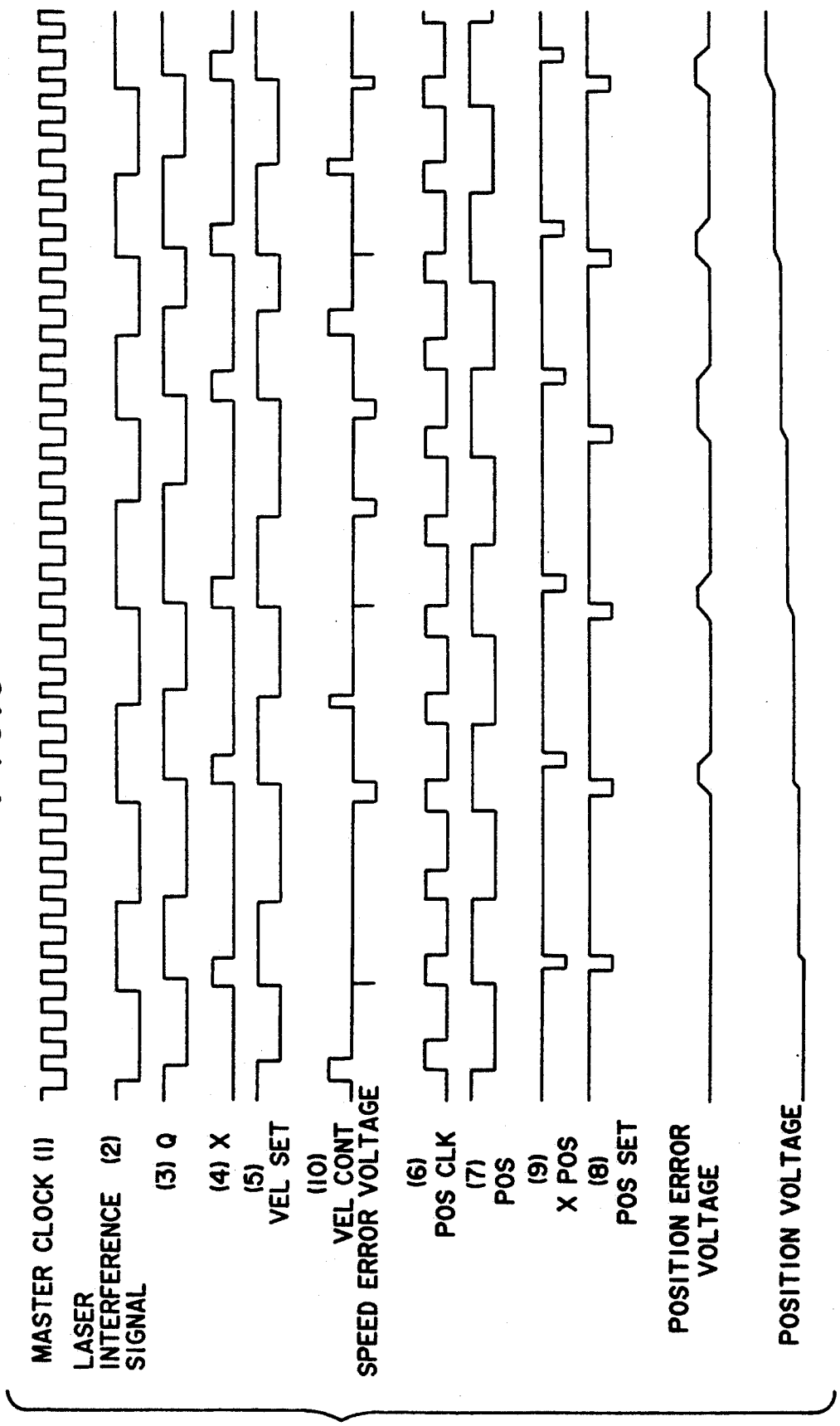

METHOD AND APPARATUS FOR CONTROLLING RECIPROCATION OF MOVABLE MIRROR FOR PHOTOACOUSTIC FOURIER TRANSFORM SPECTROSCOPY

BACKGROUND OF THE INVENTION

1. Field of the Invention

The present invention relates generally to interferometric spectrophotometers such as Fourier transform infrared (FTIR) spectrophotometers, and more particularly to a method and apparatus for controlling the reciprocation of a movable mirror of a double-beam interferometer used in such interferometric spectrophotometers.

2. Description of the Prior Art

Known double-beam interferometers include, additional to a main interferometer for producing an interferogram, a control interferometer for purposes of monitoring the reciprocating movement of a movable mirror and sampling the interferogram.

Detectors for use in Fourier transform infrared (FTIR) spectrophotometers include a pyroelectric detector such as TGS and $LiTaO_3$, a quantum detector such as MCT and InSb, and a photoacoustic (PAS) detector. In the interferometers, the speed of reciprocation of the movable mirror represents a modulation frequency. The optimum modulation frequency, however, is not the same for all such detectors but varies depending on the type of the detectors. Furthermore, in the PAS detector, different speeds of reciprocation of the movable mirror result in the detection of pieces of information having different depths from the surface of a sample.

In some FTIR spectrophotometers, the reciprocating speed of the movable mirror is variable, however, number of variable speed ranges available in such spectrophotometers are several at the greatest.

Due to the impossibility of changing the speed of mirror motion through multiple stages, the conventional FTIR spectrophotometers are unable to attain an effective use of a photoacoustic Fourier transform spectroscopy using the PAS detector which is capable of detecting different pieces of information in reliance upon different speeds of mirror motion.

In the mass-production of the interferometric spectrophotometers, the reciprocating speed of the movable mirror cannot be set such that each individual interferometric photometer has a particular maximum signal-to-noise (S/N) ratio.

SUMMARY OF THE INVENTION

With the foregoing drawbacks of the prior art in view, it is an object of the present invention to provide a method and apparatus for controlling the reciprocating movement of a movable mirror of an interferometric spectrophotometer in such a manner that the speed of reciprocation of the movable mirror can be changed with utmost ease, thereby enabling a measurement under optimum conditions.

Another object of the present invention is to provides a method and apparatus for realizing an interferometric spectrophotometer having a multispeed movable mirror which enables an effective use of a photoacoustic Fourier transform spectroscopy.

In brief, a method and an apparatus of this invention compare a signal resulting from the division of a pulse signal from an oscillator with an interference signal from a control interferometer to produce an error signal and control the reciprocating speed of a movable mirror based on the error signal.

More specifically, according to a first aspect of the present invention, there is provided a method of controlling the speed of reciprocating movement of a movable mirror of a double-beam interferometer used in an interferometric spectrophotometer and including a control interferometer, comprising the steps of: setting a frequency dividing ratio corresponding to a desired reciprocating speed of the movable mirror; dividing a pulse signal from an oscillator at the frequency dividing ratio, thereby producing a frequency-divided signal; comparing the frequency divided signal with an interference signal from the control interferometer, thereby producing an error signal; and controlling the reciprocating speed of the movable mirror based on the error signal until the desired reciprocating speed is reached.

In order to provide a desired reciprocating speed of the movable mirror, a frequency dividing ratio of the pulse signal is set whereupon the interference signal from the control interferometer is compared with a signal resulting from the division of the pulse signal at the set frequency dividing ratio. This comparison produces an error signal which in turn is used to control the reciprocating speed of the movable mirror until the desired speed is reached.

Preferably, the frequency dividing ratio can be varied by a central processing unit, for example, so that the user is able to freely change the reciprocating speed of the movable mirror to conform to the type of a detector used, thereby enabling a measurement under optimum conditions.

According to a second aspect of the present invention, there is provided an apparatus for controlling the speed of reciprocating movement of a movable mirror of a double-beam interferometer used in an interferometric spectrophotometer and including a control interferometer, comprising: means for setting a frequency dividing ratio corresponding to a desired reciprocating speed of the movable mirror; an oscillator for generating a pulse signal; means for dividing the pulse signal from the oscillator at the frequency dividing ratio, thereby producing a frequency-divided signal; means for comparing the frequency divided signal with an interference signal from the control interferometer, thereby producing an error signal; and means for controlling the reciprocating speed of the movable mirror based on the error signal until the desired reciprocating speed is reached.

The above and other objects, features and advantages of the present invention will become more apparent from the following description when making reference to the detailed description and the accompanying sheets of drawings in which a preferred structural embodiment incorporating the principles of the present invention is shown by way of illustrative example.

BRIEF DESCRIPTION OF THE DRAWINGS

FIG. 5 is a timing chart illustrative of the operation of the control apparatus shown in FIG. 2.

DETAILED DESCRIPTION OF THE PREFERRED EMBODIMENT

Figure 1:
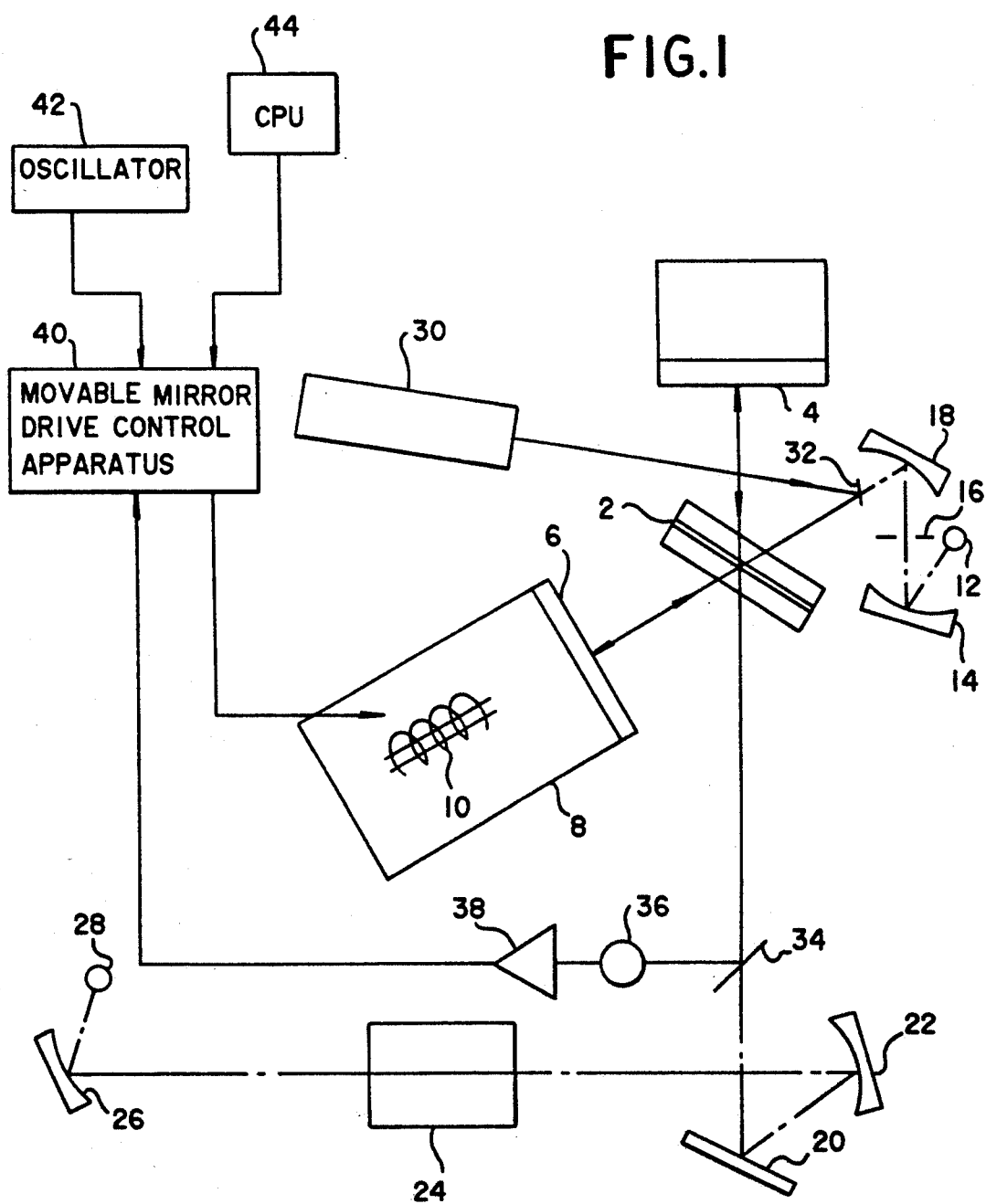
FIG. 1 is a pictorial block diagram showing the general construction of Fourier transform infrared spectrophotometer including an apparatus for controlling the speed of movement of a movable mirror according to the present invention.

FIG. 1 shows the general construction of a Fourier transform infrared (FTIR) spectrophotometer embodying the present invention.

The FTIR spectrophotometer includes a beam splitter and compensator (hereinafter referred to as "beam splitter") 2, a fixed mirror 4 and a movable mirror 6. The beam splitter 2 is disposed obliquely at an angle of 60 degrees relative to both of the normal direction of the fixed mirror 4 and the normal direction of the movable mirror 6. The fixed mirror 4 is fixedly mounted on a fixed mirror support block (not shown), while the movable mirror 6 is movably supported by a reciprocating mechanism 8. The reciprocating mechanism 8 includes a linear motor 10 for moving the movable mirror 6 toward and away from the beam splitter 2.

The beam splitter 2 and the fixed and movable mirrors 4, 6 are combined with an infrared (IR) source 12 so as to jointly constitute a main interferometer which serves as an infrared spectrometer. Infrared light from the IR source 12 is reflected by a converging mirror 14, then passes through a slit or aperture 16, subsequently is collimated by a collimator mirror 18 and finally is incident on the beam splitter 2. The light after having been modified by the main interferometer is reflected successively by a plane mirror 20 and a converging mirror 22, then passes through a sample compartment 24, subsequently is reflected by an ellipsoidal mirror 26 and finally is detected by an infrared detector 28 where the modified light is converted into an electric signal.

The beam splitter 2 and the fixed and movable mirrors 4, 6 are further combined with a light source comprised of a He-Ne laser 30 so as to jointly constitute a control interferometer. A laser beam emitted from the He-Ne laser 30 is reflected by a mirror 32 and then incident on the beam splitter 2. Interference light modified by the control interferometer is picked up by a half mirror 34 and light reflecting from the half mirror 34 is detected by a photodetector 36. A detected signal from the photodetector 36 is converted into a pulse signal by a waveform shaper 38.

A movable mirror drive control apparatus 40 is so constructed as to control the supply of electric power to the linear motor 10 of the reciprocating mechanism 8. To this end, the drive control apparatus 40 receives a pulse signal generated, as a master clock signal, by an oscillator 42 and having a frequency of several MHz. It also receives a frequency dividing ratio delivered from a central processing unit (CPU) 44 and produces an output signal whose frequency is a proper function of the frequency of the master clock signal which is determined by the frequency dividing ratio. Then, the drive control apparatus 40 compares this frequency-divided output signal with the interference signal delivered from the control interferometer after waveform shaping process and, thereafter, controls the power supply to the linear motor 10 based on the result of comparison.

The movable mirror drive control apparatus 40 will be described in greater detail with reference to FIGS. 2 through 4.

The drive control apparatus 40 includes a Type-D flip-flop 50 whose input terminals receive the master clock pulse signal from the oscillator 42 (FIG. 1) and the wave-form-shaped laser interference signal, respectively. The Q output of the Type-D flip-flop 50 and the laser interference signal are inputted to an AND gate 52 whose output is inputted to another D-type flip-flop 54. The D-type flip-flop 54 has a clock input terminal to which the master clock pulse signal is inputted. The Q output X of the D-type flip-flop 54 is delivered into a control logic circuit 56.

The frequency dividing ratio N delivered from the CPU 44 is held or latched by a latch circuit 58 and subsequently put into a first counter 60. The first counter 60 has a counter portion to which an inverted signal X' of the signal X is delivered through the logic circuit 56. The first counter 60 comprises a programmable timer as described below with reference to FIG. 3 and is constructed to output a one-shot pulse whose pulse width varies with the frequency dividing ratio N set by the CPU 44.

The frequency dividing ratio N delivered from the CPU 44 is also latched by a latch circuit 62 and subsequently put into a second counter 64. The second counter 64 outputs a pulse train which varies with the frequency dividing ratio N. The second counter 64 is a programmable counter as described below with reference to FIG. 4. The output signal POS CLK from the second counter is delivered to a D-type flip-flop 66. The Q output of the D-type flip-flop 66 is fed back to an input of the same flip-flop 66 so that the flip-flop 66 produces an output pulse signal POS having a duty cycle of 50% and a pulse rise time twice as large as the pulse rise time of the output signal POS CLK of the second counter 64. The output pulse signal POS is delivered to the control logic circuit 56.

The CPU 44 supplies a speed feedback gain to a first digital-to-analog (D/A) converter 68, the gain being variable with the speed of reciprocation of the movable mirror 6 (FIG. 1). The output from the first D/A converter 68 is inputted to an inverting amplifier 70 and a non-inverting amplifier 72 so that voltages of different polarities are produced from the amplifiers 70, 72. Output terminals of the respective amplifiers 70, 72 are connected to switches 74, 76, respectively.

The control logic circuit 56 further receives the laser interference signal. This control logic circuit 56 includes various control logic circuits. The control logic circuit 56 undertakes a phase-comparison made between the laser interference signal and the output signal VEL SET of the first counter 60 for producing signals VEL CONT', VEL CONT" to control the on-off operation of the switches 76, 74. The control logic circuit 56 further produces a signal POS SET resulting from extraction of the leading edge of the output signal POS of the flip-flop 66, and a signal X POS resulting from extraction of the leading edge of the output signal X of the flip-flop 54.

The on-off operation of the switches 74, 76 produces a signal VEL CONT which in turn is delivered to a buffer circuit 78 and thereafter represents a speed error voltage.

The signal POS SET is applied to a position counter 80 comprising an up and down counter. Position counter 80 is connected to a second digital-to-analog (D/A) converter 82 which outputs a voltage depending on the count of the position counter 80. The output from the second D/A converter 82 represents a position voltage.

The signal X POS and the signal POS SET are applied to a position error counter 84 comprising an up and down counter. The position error counter 84 counts −1 when it receives the X POS signal, counts +1 when it receives the POS SET signal, and does not advance the count when it receives both of the X POS and POS SET signals. The position error counter 84 is connected to a third digital-to-analog (D/A) converter 86 which outputs a voltage variable with the count of the position error counter 84. The output from the third D/A converter 86 represents a position error voltage.

The speed error voltage, the position voltage and the position error voltage are inputted to a power amplifier 88 where they are added together and then supplied to the linear motor 16 of the reciprocating mechanism 8 (FIG. 1) for driving the movable mirror 6 (FIG. 1).

Figure 2:
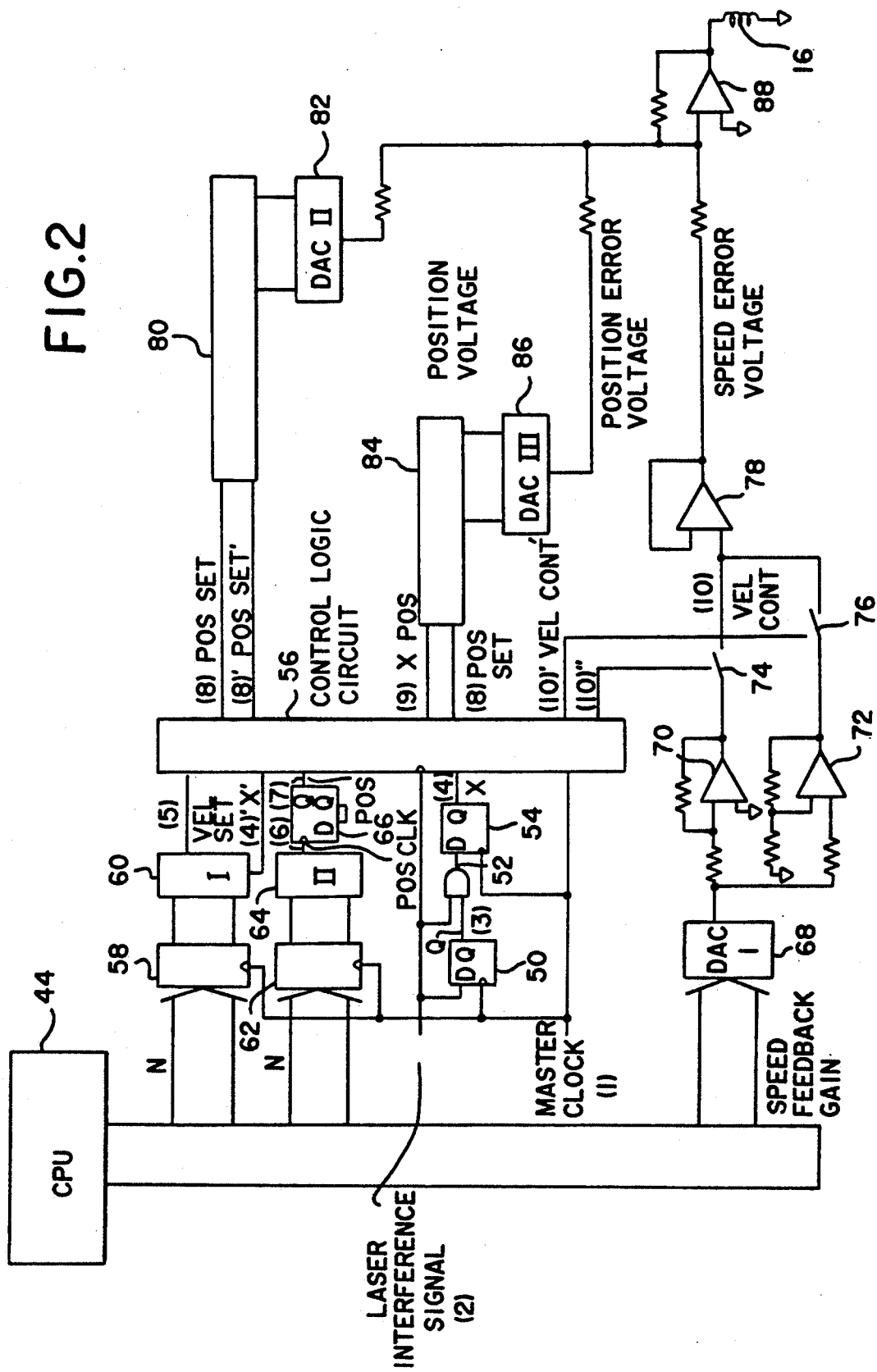
FIG. 2 is a block diagram showing the construction of the control apparatus.
Figure 3A:
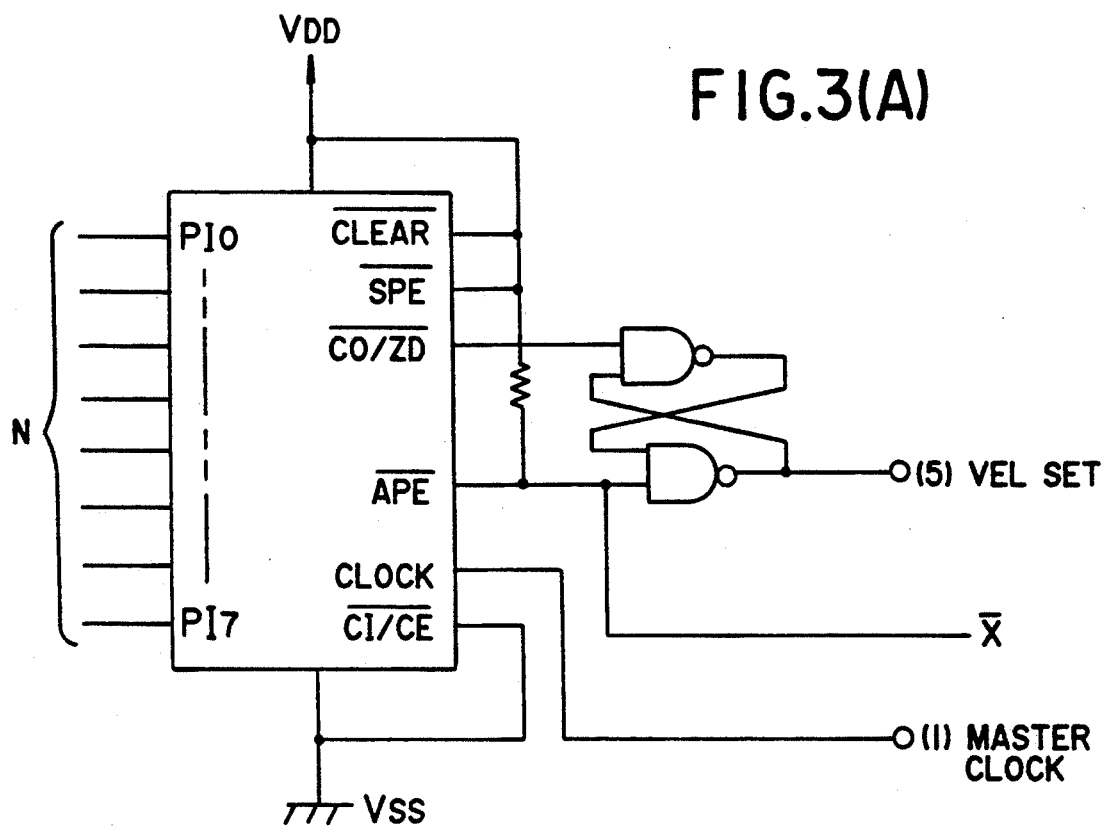
FIG. 3(A) is a block diagram of a first counter of the control apparatus shown in FIG. 2.
Figure 3B:
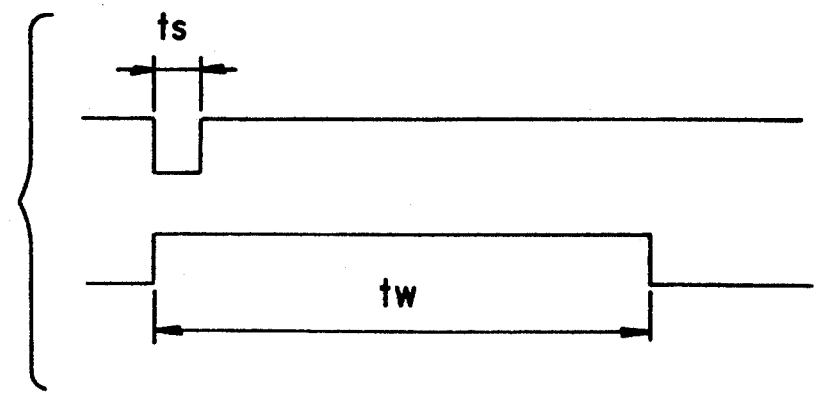
FIG. 3(B) is a timing chart illustrative of the operation of the first counter.

FIG. 3A shows an example of the first counter 60 shown in FIG. 2. The first counter 60 is a programmable timer, as described above, and the pulse width of the output signal VEL SET of this counter 60 varies with the frequency dividing ratio N set by the CPU 44 (FIG. 2).

Figure 4A:
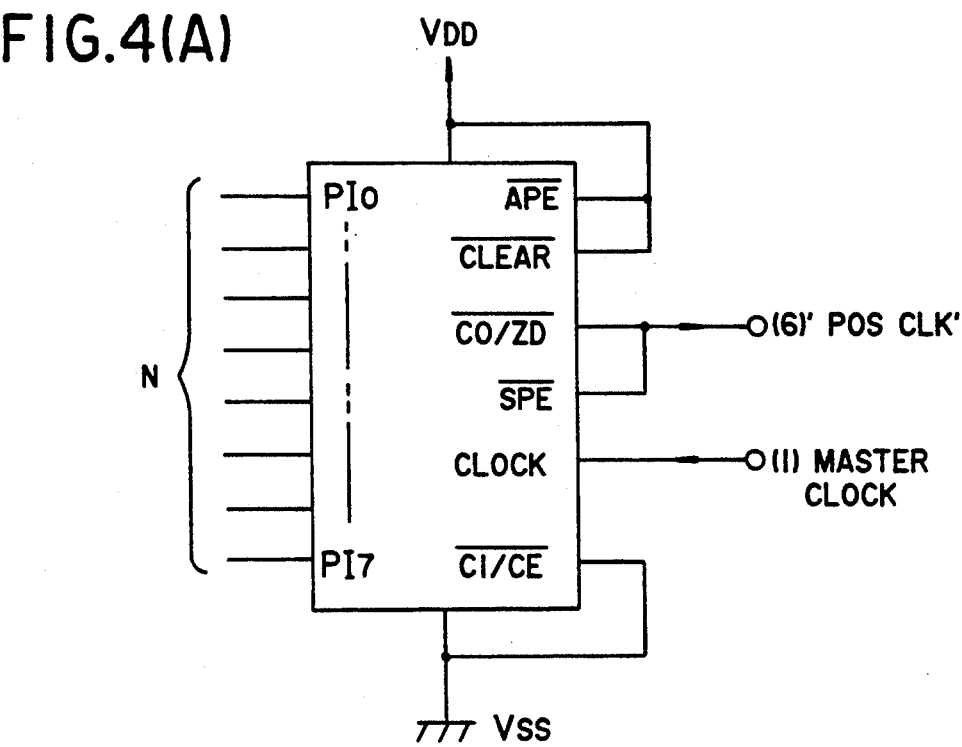
FIG. 4(A) is a block diagram of a second counter of the control apparatus shown in FIG. 2.
Figure 4B:
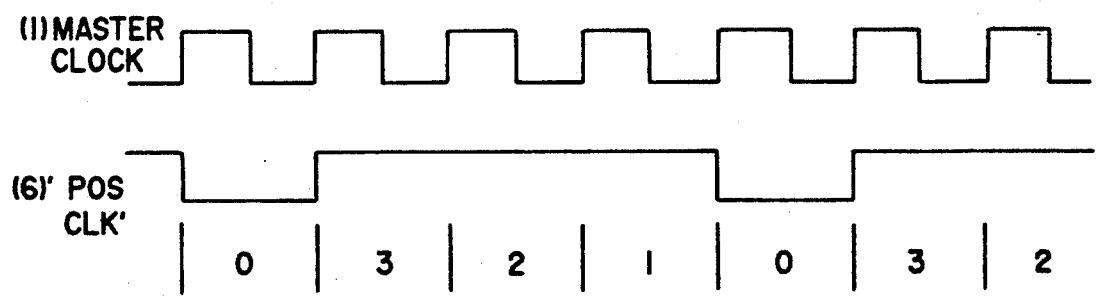
FIG. 4(B) is a timing chart illustrative of the operation of the second counter.

FIG. 4A illustrates an example of the second counter 64. The output signal POS CLK' (which is the inverted signal of the signal POS CLK) of this counter 64 varies with the frequency dividing ratio N set by the CPU 44 (FIG. 2).

Operation of the movable mirror drive control apparatus will be described below with reference to FIGS. 2 and 5.

The CPU 44 sets a frequency dividing ratio N and a speed feedback gain ( an output voltage of the D/A converter 68).

The laser interference signal is out of synchronism with the master clock pulse signal, as shown in FIG. 5. The flip-flop 50 produces a signal Q which synchronizes the laser interference signal with the master clock pulse signal. The AND gate 52 and the flip-flop 54 produce a pulse rise time signal X for the signal Q. Thus the signal X represents a rising time of the laser interference signal (namely, the current speed of movement of the movable mirror).

When the signal X' is applied to the first counter 60, the first counter 60 produces a one-shot pulse signal VEL SET which is corresponding to the frequency dividing ratio N set by the CPU 44, as described above. The control logic circuit 56 achieves a phase-comparison between the VEL SET signal and the laser interference signal. In this instance, if the interference signal is the low level and the VEL SET signal is the high level, a signal VEL CONT' tending to decelerate the speed of mirror motion is outputted from the control logic circuit 56. Conversely, if the laser interference signal is the high level and the VEL SET signal is the low level, a signal VEL CONT'' tending to accelerate the speed of mirror motion are outputted from the control logic circuit 56. These signals VEL CONT', VEL CONT'' are applied to the respective switches 76, 74 for producing a speed error voltage VEL CONT.

The second counter 64 produces a pulse signal POS CLK according to the frequency dividing ratio N set by the CPU 44. This pulse signal POS CLK is delivered to the flip-flop 66 where a signal POS is produced. The signal POS has a duty cycle of 50% and a rise time which is twice as long as the rise time of the input signal POS CLK. The control logic circuit 56 then extracts the leading edge of the signal POS and produces a signal POS SET resulting from the extraction of the leading edge of the signal POS. The signal POS SET is applied to the position counter 80 and, after being processed by the D/A counter, it represents a position signal.

The position error counter 84 receives a signal X POS and a signal POS SET from the control logic circuit 56. The output of this position error counter 84 is processed by the D/A converter 86 and then represents a position error voltage.

The movement of the movable mirror 6 (FIG. 1) is a reciprocating movement so that, when the CPU 44 issues a direction indicator signal, the signal POS SET or its inverted signal POS SET' is applied to the position counter 80, and the position counter 80 counts up or down for enabling a bidirectional speed control of the reciprocating movement of the movable mirror 6.

In the illustrated embodiment, when the master clock pulse signal generated from the oscillator 42 (FIG. 1) has a frequency of 1.5 MHz and the frequency dividing ratio N set in the counters 60, 64 is variable in the range of from 10 to 255, the frequency of the speed setting signal VEL SET can be changed substantially continuously within a range between 6.7 $\mu$s and 340 $\mu$s. This variable frequency range corresponds to a speed range of from 47.22 mm/sec to 0.93 mm/sec within which the reciprocating speed of the movable mirror can be changed at user's desire.

As described above, a signal resulting from the division of a master clock pulse signal from the oscillator is compared with an interference signal from the control interferometer to produce a speed error signal which in turn is used to control the speed of reciprocation of the movable mirror. This arrangement insures an easy setting of reciprocating speed of the movable mirror and hence is readily applicable to various detectors having different optimum modulation frequencies representing different optimum reciprocating speeds.

Since the frequency dividing ratio of the master clock pulse signal can be selected within a certain variable range, the user can choose a preferable setting of the reciprocating speed and the number of counting to minimize a measuring time. With this arrangement, an effective measurement using the photoacoustic Fourier transform spectroscopy is possible with the result that pieces of information in the direction of the depth of a sample can be obtained depending upon fine differences of the reciprocating speed.

Obviously various minor changes and modifications of the present invention are possible in the light of the above teaching. It is therefore to be understood that within the scope of the appended claims the invention may be practiced otherwise than as specifically described.

What is claimed is:

1. A method of controlling the speed of reciprocating movement of a movable mirror of a double-beam interferometer used for performing photoacoustic Fourier transform spectroscopy in an interferometric spectrophotometer and including a control interferometer, comprising the steps of:

setting a frequency dividing ratio corresponding to a desired reciprocating speed of the movable mirror, wherein said frequency dividing ratio can be varied to change the reciprocating speed of the movable mirror;

dividing a pulse signal from an oscillator at said frequency dividing ratio, thereby producing a frequency-divided signal;

comparing said frequency divided signal with an interference signal from the control interferometer, thereby producing an error signal;

controlling the reciprocating speed of the movable mirror based on said error signal until said desired reciprocating speed is reached; and detecting information based upon different speeds of motion of said mirror.

2. An apparatus for controlling the speed of reciprocating movement of a movable mirror of a double-beam interferometer used for performing photoacoustic Fourier transform spectroscopy in an interferometric spectrophotometer and including a control interferometer, comprising:

means for setting a frequency dividing ratio corresponding to a desired reciprocating speed of the movable mirror, said setting means being operative to vary said frequency dividing ratio for changing the reciprocating speed of the movable mirror;

an oscillator for generating a pulse signal;

means for dividing the pulse signal from said oscillator at said frequency dividing ratio, thereby producing a frequency-divided signal;

means for comparing said frequency divided signal with an interference signal from the control interferometer, thereby producing an error signal;

means for controlling the reciprocating speed of the movable mirror based on said error signal until said desired reciprocating speed is reached; and photoacoustic detector means for detecting information based upon different speeds of motion of said mirror.

3. An apparatus according to claim 2, wherein said setting means comprises a central processing unit.

4. An apparatus according to claim 2, wherein said comparing means comprises a control logic circuit, said dividing means including a first flip-flop receiving said pulse signal from said oscillator and said interference signal, an AND gate receiving an output from said first flip-flop and said interference signal, a second flip-flop receiving an output from said AND gate and said pulse signal from said oscillator and delivering an output signal to said control logic circuit, and a counter an inverted signal of said output signal from said control logic circuit and said frequency dividing ratio and delivering said frequency-divided signal to said control logic circuit.

5. An apparatus according to claim 4, wherein said counter comprises a programmable timer capable of producing a one-shot pulse having a pulse width variable with said frequency dividing ratio.

* * * * *